(12) United States Patent
Yamaguchi et al.

(10) Patent No.: US 8,605,792 B2
(45) Date of Patent: Dec. 10, 2013

(54) SLICE CODING ALLOCATION METHOD, APPARATUS AND CIRCUIT

(75) Inventors: Yousuke Yamaguchi, Fukuoka (JP); Takato Ohashi, Fukuoka (JP); Noriaki Tsukuda, Fukuoka (JP); Kazuhiro Yamashita, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 854 days.

(21) Appl. No.: 12/662,135

(22) Filed: Mar. 31, 2010

(65) Prior Publication Data
US 2010/0189184 A1 Jul. 29, 2010

Related U.S. Application Data

(63) Continuation of application No. PCT/JP2007/069468, filed on Oct. 4, 2007.

(51) Int. Cl.
*H04N 7/12* (2006.01)

(52) U.S. Cl.
USPC .................................................. 375/240.24

(58) Field of Classification Search
USPC .................................................. 375/240.24
See application file for complete search history.

(56) References Cited

U.S. PATENT DOCUMENTS

| | | | |
|---|---|---|---|
| 2002/0172280 A1* | 11/2002 | Ducloux et al. | 375/240.12 |
| 2005/0008079 A1 | 1/2005 | Boon et al. | |
| 2007/0230574 A1 | 10/2007 | Valente | |
| 2008/0008250 A1* | 1/2008 | Mori et al. | 375/240.24 |

FOREIGN PATENT DOCUMENTS

| | | |
|---|---|---|
| JP | 5-236464 | 9/1993 |
| JP | 2005-33336 | 2/2005 |
| JP | 2005-124041 | 5/2005 |
| WO | 2005/117449 | 12/2005 |

OTHER PUBLICATIONS

Japanese Office Action issued Aug. 14, 2012 in corresponding Japanese Patent Application No. 2009-535933.
International Search Report for PCT/JP2007/069468, mailed on Nov. 27, 2007.

* cited by examiner

*Primary Examiner* — Richard Torrente
(74) *Attorney, Agent, or Firm* — Staas & Halsey LLP

(57) ABSTRACT

A coding apparatus is for performing a deblocking filter process by dividing input moving image data into frames, and coding the moving image data by dividing the frames into macroblock lines and by shifting and changing, for each frame, a refresh area in which an amount of coding information allocated to a specific macroblock line is larger than that of another macroblock line. The coding apparatus includes a determining unit that determines that a refresh area in a current frame as well as a macroblock line in the current frame corresponding to a macroblock line that will become a refresh area in a frame being subsequently subjected to the coding process becomes a next refresh area. The coding apparatus includes a coding unit that codes the refresh area and the next refresh area by allocating a larger amount of coding information than an amount allocated to the other macroblock line.

9 Claims, 18 Drawing Sheets

| SETTING CONTENT | CODING METHOD SELECTION |
|---|---|
| NORMAL METHOD | 0 |
| FIRST CODING METHOD | 1 |
| SECOND CODING METHOD | 0 |
| THIRD CODING METHOD | 0 |
| FOURTH CODING METHOD | 0 |

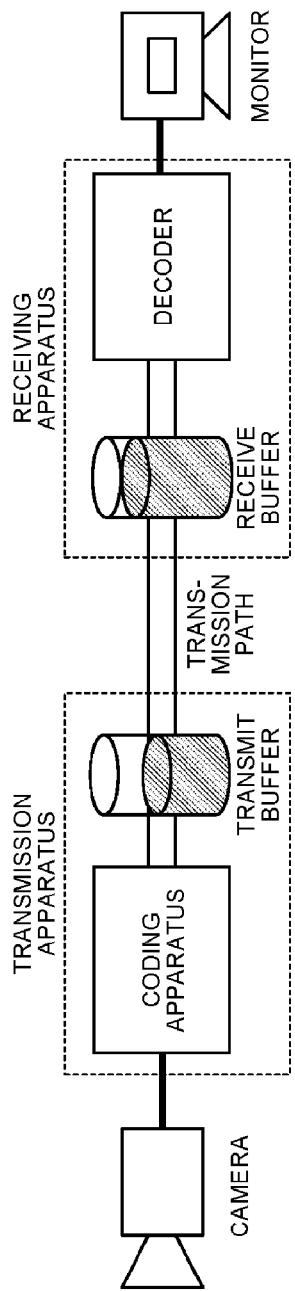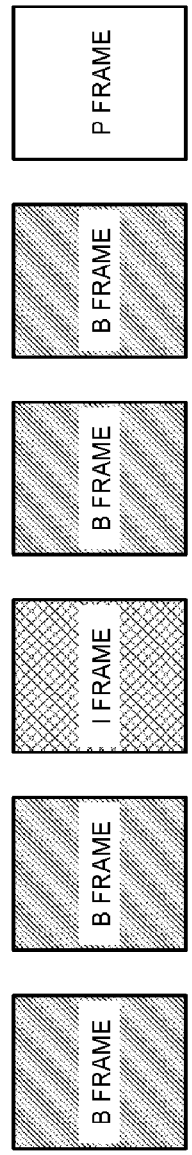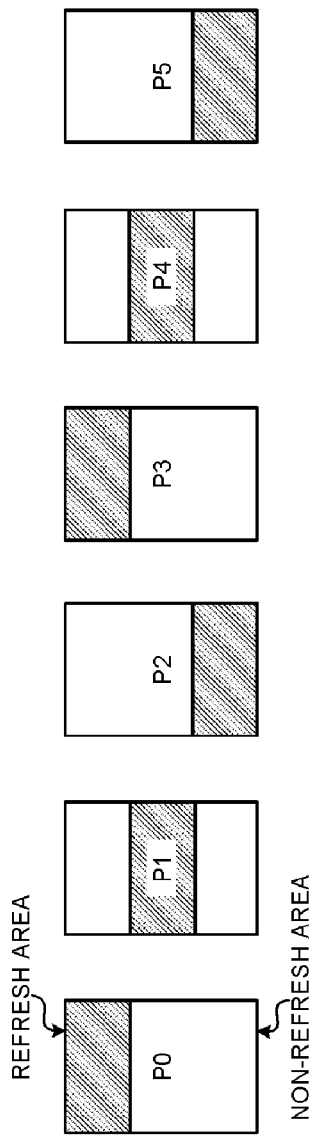

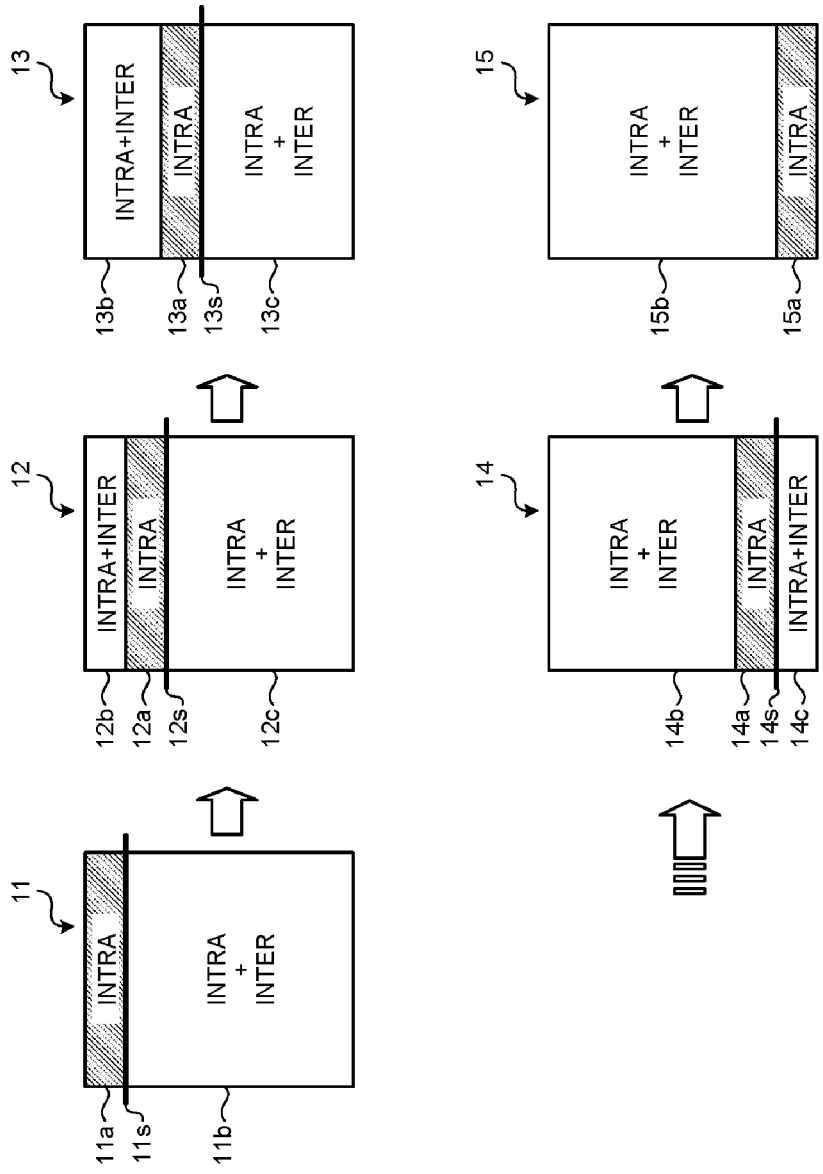

SLICE CODING ALLOCATION METHOD, APPARATUS AND CIRCUIT

CROSS-REFERENCE TO RELATED APPLICATION

This application is a continuation of International Application No. PCT/JP2007/069468, filed on Oct. 4, 2007, the entire contents of which are incorporated herein by reference.

FIELD

The embodiments discussed herein are directed to a coding apparatus, a coding method, a coding program, and a coding circuit.

BACKGROUND

Conventionally, as illustrated in FIG. 15, with an image transmission system including a coding apparatus that displays video images acquired by a camera as real time moving images on a monitor, in order to reduce the amount of coding information, moving images are coded using a coding method in which I frames or B frames are inserted at regular intervals (see FIG. 16). In recent years, as illustrated in FIG. 17, by aiming at shortening the initial delay time (VBV Delay) for displaying video images on a monitor, a step-by-step refresh method has been used, in which an area (refresh area) subjected to an intra coding that processes a large amount of coding information is shifted for each frame (for example, see Japanese Laid-open Patent Publication No. 2005-124041).

Specifically, as illustrated in FIG. 18, with the coding method in which the I frames or the B frames are inserted at regular intervals, because the amount of coding information varies in each frame, a transmit/receive buffer having a large capacity needs to be designed for stable transmission and reception of a stream, thus needing a long initial delay time. In contrast, as illustrated in FIG. 19, with the coding method using the step-by-step refresh method, amount of coding information in each frame can be made uniform; therefore, a stable transmission and reception of a stream can be implemented without making the capacity of the transmit/receive buffer large. Accordingly, the amount of data stored in the transmit/receive buffer can be reduced, thus shortening the initial delay time until the commencement of decoding.

With the international telecommunication union telecommunication standardization sector (ITU-T) Rec.H.264/advanced video coding (AVC) (hereinafter, "H.264 coding method"), which is a typical coding technology in use today, when moving images are coded using the step-by-step refresh method, even though a deblocking filter process that removes distortion of the block boundary is performed, the distortion of the block boundary is not sufficiently removed.

Specifically, the deblocking filter process is used to smooth distortion of a block boundary by performing a predetermined calculation using pixel values of adjacent macroblocks. However, when the deblocking filter process is performed on a boundary between a refresh area in which a large amount of coding information is processed and a non-refresh area in which a small amount of coding information is processed, the distortion of the block boundary cannot be sufficiently removed because the pixel values of the macroblocks in the non-refresh area are used in the calculation for smoothing the macroblocks in the refresh area (hereinafter, in a calculation for smoothing macroblocks in a refresh area, using the pixel values of macroblocks in a non-refresh area is referred to as "leakage").

In the example as illustrated in FIG. 20, the deblocking filter process is assumed to be performed on the block boundary (1) illustrated in FIG. 20, which is a boundary between a refresh area and a non-refresh area. The pixel values of the column (2) in FIG. 20 at the time the deblocking filter process is performed are illustrated in FIG. 21. FIG. 21 is a schematic diagram illustrating pixel values before the deblocking filter process and pixel values after the deblocking filter process is performed on the column (2) in FIG. 20. The pixel value "S0" after the deblocking filter process illustrated in FIG. 21 can be obtained using the equation represented by "S0=((s2×1)+(s1×2)+(s0×2)+(t0×2)+(t1×1)+4)/8".

Specifically, the pixel value "S0" after the deblocking filter process is calculated using the pixel values "t0" and "t1" of the non-refresh area. When the pixel value "S0" of the refresh area is calculated using the pixel values "t0" and "t1" of the non-refresh area in which degradation of image is severe, distortion of the block boundary of the refresh area cannot be sufficiently removed.

When the distortion of the block boundary cannot be sufficiently removed using a deblocking filter, a motion compensation process is performed in a state in which distortion is present at the block boundary, which in turn causes image degradation to propagate to the next and subsequent frames.

To solve this problem, "leakage" can be prevented using a method described below. A first method is a method in which a deblocking filter processing function is not applied to all frames. With the H.264 coding method, it is possible to set the deblocking filter processing function by changing a parameter so that the function is not applied. Accordingly, "leakage" can be prevented by setting the deblocking filter processing function to not be applied only when a moving image is coded using the step-by-step refresh method.

A second method is a method in which the deblocking filter processing function is not applied to only the boundary between the refresh area and the non-refresh area. Specifically, a slice dividing function, which is used to divide a single frame into two or more frames, is applied to the boundary between the refresh area and the non-refresh area, and the deblocking filter processing function is set to be applied except a slice boundary. Accordingly, "leakage" can be prevented while the deblocking filter processing function is applied to areas other than the slice boundary.

FIG. 22 is a schematic diagram illustrating a method of preventing leakage using the slice dividing function. In the example illustrated in FIG. 22, a case is described in which a coding apparatus divides an input moving image signal into a plurality of frames 11 to 15 in time series and codes the frames this order: frame 11, frame 12, frame 13, ..., frame 14, and frame 15. Another frame is present between the frame 13 and the frame 14; however, a description and a drawing thereof are omitted here.

As illustrated in FIG. 22, the coding apparatus divides each of frames 11 to 15 into macroblocks, then partitions the macroblocks into macroblock lines that are an assembly of macroblocks, and shifts down one macroblock line, which becomes a refresh area, for each successive frame. Specifically, a macroblock line 11a is determined to become the target of a refresh area in the frame 11, and a macroblock line 12a is determined to become the target of a refresh area in the frame 12, which is subsequently processed. In this way, in the example illustrated in FIG. 22, the coding apparatus codes the moving image using the step-by-step refresh method in which refresh areas are sequentially shifted down one macroblock line for each frame.

A macroblock line group 11b is partitioned into macroblock lines having the same height as that of the macroblock line 11a; however, an image of the partition is not illustrated in the figure and is referred to as a "macroblock line group" in this specification. This also applies to macroblock line groups 12c, 13b, 13c, 14b, and 15b in a similar manner.

In FIG. 22, the macroblock line indicated by "intra+inter" (for example, the macroblock line group 11b) indicates that it is coded, for each macroblock, using one of the intra coding and the inter coding, whichever processes a smaller amount of coding information. In general, the amount of coding information to be processed in the inter coding is smaller than that in the intra coding; however, with the H.264 coding method, there is a case in which the amount of coding information to be processed in the intra coding is smaller than that in the inter coding due to an intra prediction function being used (also called "intra-frame prediction") in which compressibility is improved by using pixel correlation between blocks.

The intra prediction function has a plurality of prediction modes; the amount of coding information varies according to the prediction mode. When a refresh area is intra coded, the coding apparatus codes the refresh area in a prediction mode that exhibits the highest coding efficiency. When a non-refresh area is intra coded, the coding apparatus codes the non-refresh area in a prediction mode that processes a small amount of coding information.

When a moving image is coded using the step-by-step refresh method in this way, if a frame is subjected to the deblocking filter process, leakage from a non-refresh area, in which a small amount of coding information is processed, occurs into a refresh area, in which a large amount of coding information is processed. In the example illustrated in FIG. 22, in the frame 11, leakage from the macroblock line group 11b of the non-refresh area occurs into the macroblock line 11a of the refresh area.

To prevent such leakage, in the example illustrated in FIG. 22, the slice dividing function is applied to the boundary between the refresh area and the non-refresh area, and the deblocking filter process is performed on the frame 11 except the slice boundary. For example, in the frame 11, the boundary between the macroblock line 11a and the macroblock line group 11b is divided using the slice dividing function, and only a slice boundary 11s is not subjected to the deblocking filter process. Similarly, in the frame 12, only a slice boundary 12s is not subjected to the deblocking filter process.

However, with the conventional method in which the deblocking filter function is not applied to all the frames as described above, there is a problem in that distortion of the block boundary cannot be smoothed, even though smoothing is the purpose of the deblocking filter process. This leads to a problem of image degradation due to block distortion significantly appearing in the moving image to be decoded.

Furthermore, with the conventional method in which the slice dividing function is used and the deblocking filter processing function is applied to except the slice boundary, an image is degraded because overhead occurs due to the addition of a slice header. Specifically, a predetermined amount of information is needed to add the slice header, meaning the amount of information allocated to the coding needs to be reduced. Accordingly, the moving image to be decoded is degraded.

Furthermore, when the slice dividing function is used, compression efficiency of the coding is reduced because the intra prediction function cannot be applied to the frames that are divided using the slice dividing function. This means that efficient coding cannot be performed, thus causing a problem of degradation of the moving image to be decoded.

As described above, using the step-by-step refresh method, when the moving image is coded using the H.264 coding method or the like that has a deblocking filter processing function, an important issue is how to minimize the degree of degradation of the moving image to be decoded during the coding.

SUMMARY

According to an aspect of an embodiment of the invention, a coding apparatus is for performing a deblocking filter process by dividing input moving image data into frames, and coding the moving image data by dividing the frames into macroblock lines and by shifting and changing, for each frame, a refresh area in which an amount of coding information allocated to a specific macroblock line is larger than that of another macroblock line. The coding apparatus includes a refresh area determining unit that determines that a refresh area in a current frame being subjected to a coding process as well as a macroblock line in the current frame corresponding to a macroblock line that will become a refresh area in a frame being subsequently subjected to the coding process becomes a next refresh area that indicates a second refresh area in the current frame; and a coding unit that codes the refresh area and the next refresh area by allocating a larger amount of coding information than an amount allocated to the other macroblock line.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 15 is a schematic diagram illustrating an image transmission system;

FIG. 16 is a schematic diagram illustrating a normal coding process;

FIG. 17 is a schematic diagram illustrating a coding process using a step-by-step refresh method;

FIG. 22 is a schematic diagram illustrating a method of preventing leakage using a slice dividing function.

DESCRIPTION OF EMBODIMENTS

Preferred embodiments of the present invention will be explained with reference to accompanying drawings. In the following embodiments, a description is given of a case in which the present invention is applied to a coding apparatus that is used to code a moving image in accordance with the H.264 coding method.

[a] First Embodiment

First, the outline of a coding process performed by a coding apparatus according to a first embodiment will be described. The coding apparatus according to the first embodiment not only determines that a macroblock line becomes a refresh area using a step-by-step refresh method but also determines that a macroblock line that corresponds to a macroblock line that will become a refresh area in a subsequently processed frame becomes a refresh area.

Figure 1:
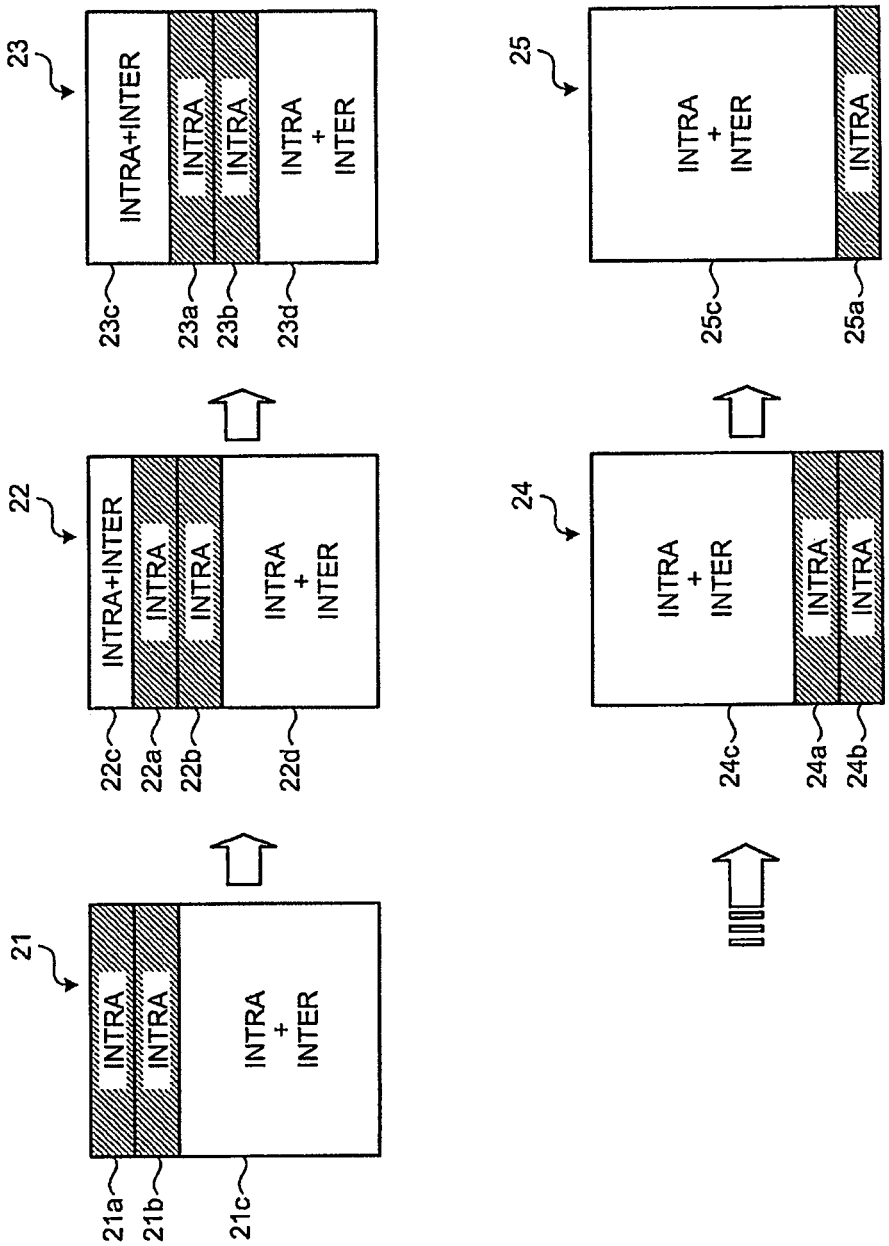
FIG. 1 is a schematic diagram illustrating the outline of a coding process performed by a coding apparatus according to a first embodiment.

A detailed description will be given with reference to FIG. 1. FIG. 1 is a schematic diagram illustrating the outline of the coding process performed by the coding apparatus according to the first embodiment. As illustrated in FIG. 1, when a frame 21 is coded, the coding apparatus according to the first embodiment not only determines that a macroblock line 21a becomes a refresh area using the step-by-step refresh method but also determines that a macroblock line 21b that corresponds to a macroblock line 22a that will become a refresh area in a subsequently processed frame 22 becomes a refresh area (hereinafter, in a case where a macroblock line in a current frame that corresponds to a macroblock line that will become a refresh area in a subsequently processed frame is made to be a target refresh area, the area corresponding to the target refresh area is referred to as a "next refresh area").

Because the macroblock line 21a and the macroblock line 21b that are determined to become refresh areas are intra coded to which a large amount of coding information is allocated, leakage between the macroblock line 21a and the macroblock line 21b does not occur. Accordingly, even when a macroblock line 22c in the frame 22 is inter coded, the macroblock line 22c refers to the macroblock line 21a in which the leakage does not occur.

Similarly, when the coding apparatus according to the first embodiment codes the frame 22, the coding apparatus determines that the macroblock line 22a becomes a refresh area and determines that a macroblock line 22b becomes a next refresh area. Accordingly, even when a macroblock line group 23c in a frame 23 is inter coded, the macroblock line group 23c refers to the macroblock lines 22a and 22c from which leakage does not occur.

In the frame 21, leakage from a macroblock line group 21c occurs in the macroblock line 21b. However, when a macroblock line group 22d in the frame 22 is inter coded, the macroblock line group 22d does not refer to the macroblock line 21b from which the leakage occurs.

Furthermore, in the frame 22, even when the macroblock line 22c is inter coded, leakage from the macroblock line 22c does not occur into the macroblock line 22a. The leakage occurs, during the deblocking filter process, caused by obtaining pixel values of a refresh area using pixel values of a non-refresh area where severe image degradation occurs. However, because the macroblock line 22c refers to the macroblock line 21a that is a refresh area, image degradation is small.

As described above, the coding apparatus according to the first embodiment not only determines that a macroblock line becomes a refresh area using a step-by-step refresh method but also determines that a macroblock line that corresponds to a macroblock line that will become a refresh area in a subsequently processed frame becomes a next refresh area. Accordingly, the macroblock line in a subsequently processed frame to be inter coded does not refer to a macroblock line from which leakage occurs. As a result, it is possible to eliminate the problem of image degradation propagating to the next and subsequent frames caused by referring to the frame from which leakage occurs. Furthermore, because the deblocking filter processing function is applied to all frames, it is possible to smooth distortion at a block boundary and to reduce the occurrence of block distortion in a moving image to be decoded. Furthermore, because a slice dividing function is not applied, there is no problem such as image degradation due to adding a slice header and no problem that an intra prediction function cannot be applied to frames that are divided using the slice dividing function. Accordingly, the coding apparatus according to the first embodiment can code, using the H.264 coding method, moving images to be decoded without degrading the moving images while shortening the initial delay time by using the step-by-step refresh method.

Figure 2:
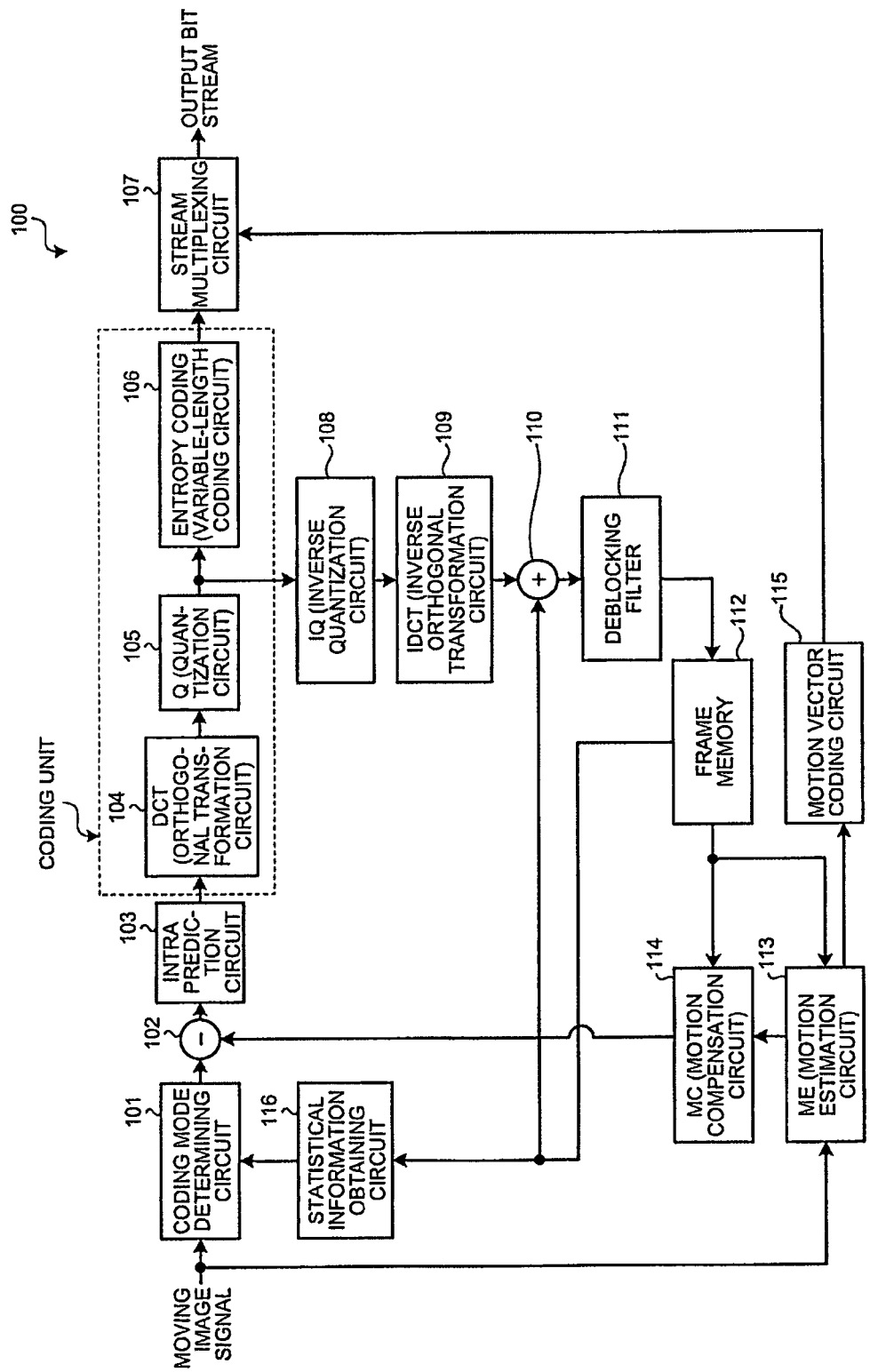
FIG. 2 is a schematic diagram illustrating the configuration of a circuit of the coding apparatus according to the first embodiment.

Next, the configuration of a circuit of a coding apparatus 100 according to the first embodiment will be described. FIG. 2 is a schematic diagram illustrating the configuration of the circuit of the coding apparatus 100 according to the first embodiment. As illustrated in FIG. 2, the coding apparatus 100 includes a coding mode determining circuit 101, a subtraction circuit 102, an intra prediction circuit 103, an orthogonal transformation circuit 104, a quantization circuit 105, a variable-length coding circuit 106, a stream multiplexing circuit 107, an inverse quantization circuit 108, an inverse orthogonal transformation circuit 109, an adding circuit 110, a deblocking filter 111, a frame memory 112, a motion estimation circuit 113, a motion compensation circuit 114, a motion vector coding circuit 115, and a statistical information obtaining circuit 116. In the following, a "current frame signal" represents a frame signal that is currently being processed, a "previous frame signal" represents a frame signal that is processed before the current frame signal is processed, and a "next frame signal" represents a frame signal that is processed after the current frame signal is processed.

The coding mode determining circuit 101 is a circuit that is used to divide a received moving image signal into a plurality of frames in time series, then divides each frame into macroblocks, and determines, for each macroblock, which one of an intra coding mode and an inter coding mode is used for coding. The coding mode determining circuit 101 outputs, to the subtraction circuit 102, a frame signal containing information indicating which coding mode is used to code a particular macroblock. The process performed by the coding mode determining circuit 101 will be described in detail later.

The subtraction circuit 102 is a circuit that is used to remove redundancy in the frame signal received from the coding mode determining circuit 101. Specifically, the subtraction circuit 102 processes only macroblocks, as determined by the coding mode determining circuit 101, that are to be inter coded; obtains a difference value between a pixel value of a macroblock to be processed and a pixel value of a previous frame signal received from the motion compensation circuit 114; and outputs, to the intra prediction circuit 103, a frame signal subjected to a subtraction process.

The intra prediction circuit 103 is a circuit that is used to perform inner-frame prediction using pixel correlation between blocks. Specifically, the intra prediction circuit 103 processes only the macroblocks, as determined by the coding mode determining circuit 101, that are to be subjected to intra coding and intra prediction; performs inner-frame prediction on the macroblocks to be processed in a prediction mode that is determined by the coding mode determining circuit 101; and outputs the frame signal subjected to the inner-frame prediction to the orthogonal transformation circuit 104.

The orthogonal transformation circuit 104 is a circuit that is used to remove redundancy in a frame and perform a coding. Specifically, the orthogonal transformation circuit 104 transforms the frame signal received from the intra prediction circuit 103 into a frequency component for each predetermined sized block using, for example, a discrete cosine transform (DCT) and outputs the resulting transformation coefficient subjected to the orthogonal transformation to the quantization circuit 105.

The quantization circuit 105 is a circuit that is used to quantize the transformation coefficient received from the orthogonal transformation circuit 104 and output the quantized code to the variable-length coding circuit 106 and the inverse quantization circuit 108.

The variable-length coding circuit 106 is a circuit that is used to perform variable-length coding on the quantized code received from the quantization circuit 105 and output the code subjected to variable-length coding to the stream multiplexing circuit 107 in macroblock units.

The stream multiplexing circuit 107 is a circuit that is used to form a coding bit stream from a code subjected to the variable-length coding received from the variable-length coding circuit 106. Specifically, if the macroblock is intra coded, the stream multiplexing circuit 107 forms a coding bit stream in which a predetermined header is added to a code that is subjected to the variable-length coding and is received from the variable-length coding circuit 106. If a macroblock is inter coded, the stream multiplexing circuit 107 forms a coding bit stream in which predetermined headers are added to a code, which is subjected to the variable-length coding and is received from the variable-length coding circuit 106, and to a coding signal received from the motion vector coding circuit 115, and then outputs the formed coding bit stream to a receive buffer.

The inverse quantization circuit 108 is a circuit that is used to perform an inverse quantization in which a quantized code received from the quantization circuit 105 is inversely quantized to a transformation coefficient having the original frequency component and to output the inversely-quantized transformation coefficient to the inverse orthogonal transformation circuit 109.

The inverse orthogonal transformation circuit 109 is a circuit that is used to perform an inverse orthogonal transformation in which the transformation coefficient having the frequency component received from the inverse quantization circuit 108 is inversely and orthogonally transformed to a frame signal and to output the frame signal subjected to the inverse orthogonal transformation to the adding circuit 110.

The adding circuit 110 is a circuit that is used to regenerate the frame signal received from the inverse orthogonal transformation circuit 109. Specifically, the adding circuit 110 performs processing on only the inter coded macroblock, regenerates a frame signal by adding the macroblock to be processed to a frame signal subjected to a motion compensation received from the motion compensation circuit 114, and outputs the regenerated frame signal to the deblocking filter 111.

The deblocking filter 111 is a circuit that is used to reduce distortion between blocks occurring during the coding process that is performed in block units. The deblocking filter 111 performs a deblocking filter process on the image signal received from the adding circuit 110 and outputs, to the frame memory 112, the frame signal subjected to the deblocking filter process.

The frame memory 112 is a memory device that is used to sequentially store therein frame signals received from the deblocking filter 111. The frame signals stored in the frame memory 112 are sequentially read by the statistical information obtaining circuit 116. Furthermore, when the frame signals are inter coded, the frame signals are read, as needed, by the motion estimation circuit 113 and the motion compensation circuit 114.

The motion estimation circuit 113 is a circuit that is used to detect a motion vector that represents the size and the orientation of images between frames in predetermined units. Specifically, the motion estimation circuit 113, which only performs a process on inter coded macroblocks, detects a motion vector from the current frame signal and the previous frame signal or from the current frame signal and the next frame signal read from the frame memory 112, and outputs the detected motion vector to the motion compensation circuit 114 and the motion vector coding circuit 115.

The motion compensation circuit 114 is a circuit that is used to perform motion compensation on a portion where motion is present in accordance with the motion obtained from a frame signal read from the frame memory 112. Specifically, the motion compensation circuit 114, which only performs processing on inter coded macroblocks, performs motion compensation, in predetermined units, using the motion vector received from the motion estimation circuit 113 and outputs the frame signal subjected to the motion compensation to the subtraction circuit 102 and the adding circuit 110.

The statistical information obtaining circuit 116 is used to read the previous frame signal from the frame memory 112, analyze the read previous frame signal for each macroblock, and output, to the coding mode determining circuit 101, statistical information including information indicating whether a macroblock is intra coded or inter coded and statistical information including the amount of coding information obtained if a coding is performed.

Figure 3:
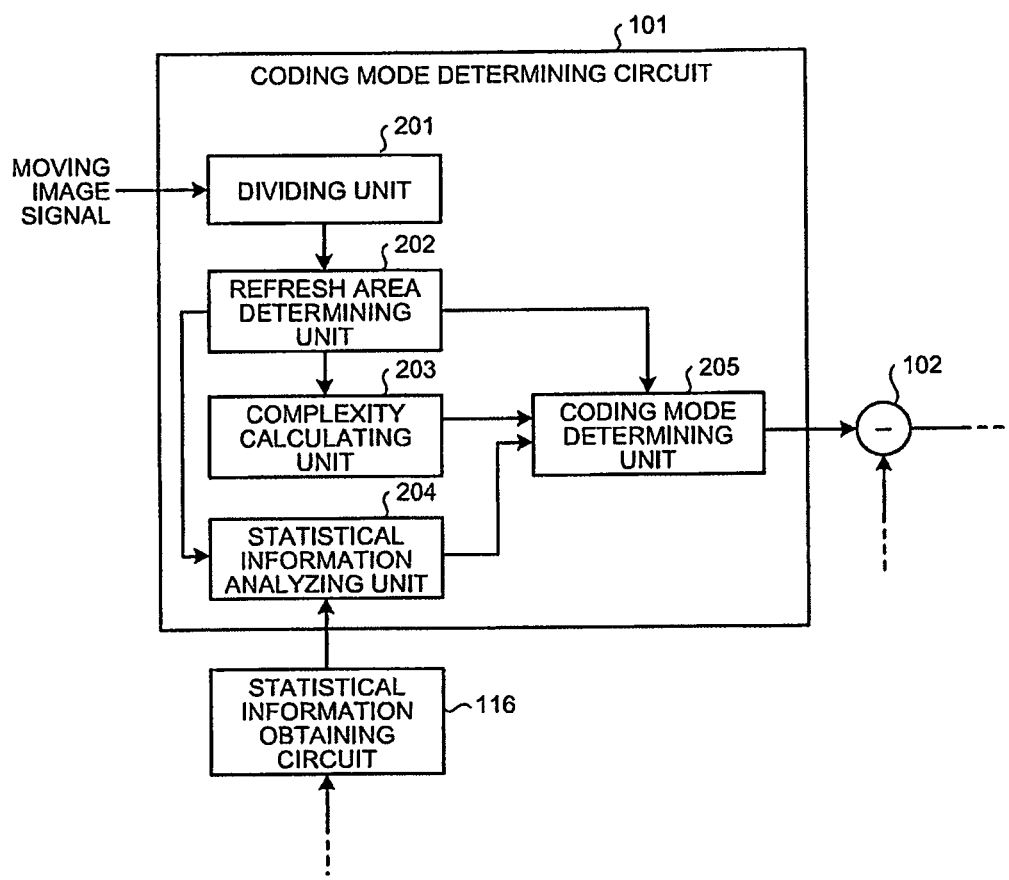
FIG. 3 is a functional block diagram illustrating the configuration of a coding mode determining circuit illustrated in FIG. 2.

Next, the configuration of the coding mode determining circuit 101 illustrated in FIG. 2 will be described. FIG. 3 is a functional block diagram illustrating the configuration of the coding mode determining circuit 101 illustrated in FIG. 2. As illustrated in FIG. 3, the coding mode determining circuit 101 includes a dividing unit 201, a refresh area determining unit 202, a complexity calculating unit 203, a statistical information analyzing unit 204, and a coding mode determining unit 205.

The dividing unit 201 is a processing unit that divides the received moving image signal into a plurality of frames in time series, then divides each frame into macroblocks of "16×16" pixels, and outputs, to the refresh area determining unit 202, the frame signal after dividing the frames into macroblocks.

The refresh area determining unit 202 is a processing unit that partitions the frame signal, divided into macroblocks by the dividing unit 201, into macroblock line units that corresponds to an assembly of macroblocks and determines whether a macroblock line becomes a refresh area or the next refresh area. Specifically, the refresh area determining unit 202 not only determines that a macroblock line becomes a refresh area using a step-by-step refresh method but also determines that a macroblock line that corresponds to a macroblock line that will become a refresh area in a subsequently processed frame becomes a next refresh area. Then, the refresh area determining unit 202 outputs the frame signal containing information indicating whether a macroblock line becomes a refresh area or becomes the next refresh area to the complexity calculating unit 203, to the statistical information analyzing unit 204, and to the coding mode determining unit 205.

For macroblock lines other than the refresh area and the next refresh area contained in the frame signal received from the refresh area determining unit 202, the complexity calculating unit 203 is a processing unit that calculates a feature value indicating the complexity of each macroblock and outputs the calculated feature value to the coding mode determining unit 205.

For macroblock lines other than the refresh area and the next refresh area contained in the frame signal received from the refresh area determining unit 202, the statistical information analyzing unit 204 is a processing unit that analyzes, for each macroblock, which one of the intra coding and the inter coding processes less coding information for coding the macroblocks, and outputs the result of the analysis to the coding mode determining unit 205. At this time, the statistical information analyzing unit 204 performs an analysis on the basis of statistical information received from the statistical information obtaining circuit 116.

The coding mode determining unit 205 is a processing unit that determines, for each macroblock, which one of the intra coding mode and the inter coding mode is used for coding the frame signal on the basis of information received from the refresh area determining unit 202, the complexity calculating unit 203, and the statistical information analyzing unit 204.

Specifically, first, the coding mode determining unit 205 determines that the macroblock line that is determined by the refresh area determining unit 202 to become a refresh area or a next refresh area is coded in an intra coding mode that processes a large amount of coding information. Furthermore, the coding mode determining unit 205 determines whether the intra prediction function is applied to the macroblock line. If the intra prediction function is applied, the coding mode determining unit 205 determines which prediction mode is used for the intra prediction.

For the macroblock lines other than the refresh area and the next refresh area, the coding mode determining unit 205 determines, for each macroblock, which one of the intra coding mode and the inter coding mode is used for coding. At this time, on the basis of the feature value received from the complexity calculating unit 203 and an analysis result received from the statistical information analyzing unit 204, the coding mode determining unit 205 selects, from among either one of the intra coding mode and inter coding mode, a coding mode that processes the smaller amount of coding information. Furthermore, if the intra coding mode is selected, the coding mode determining unit 205 determines whether the intra prediction function is applied thereto.

Figure 4:
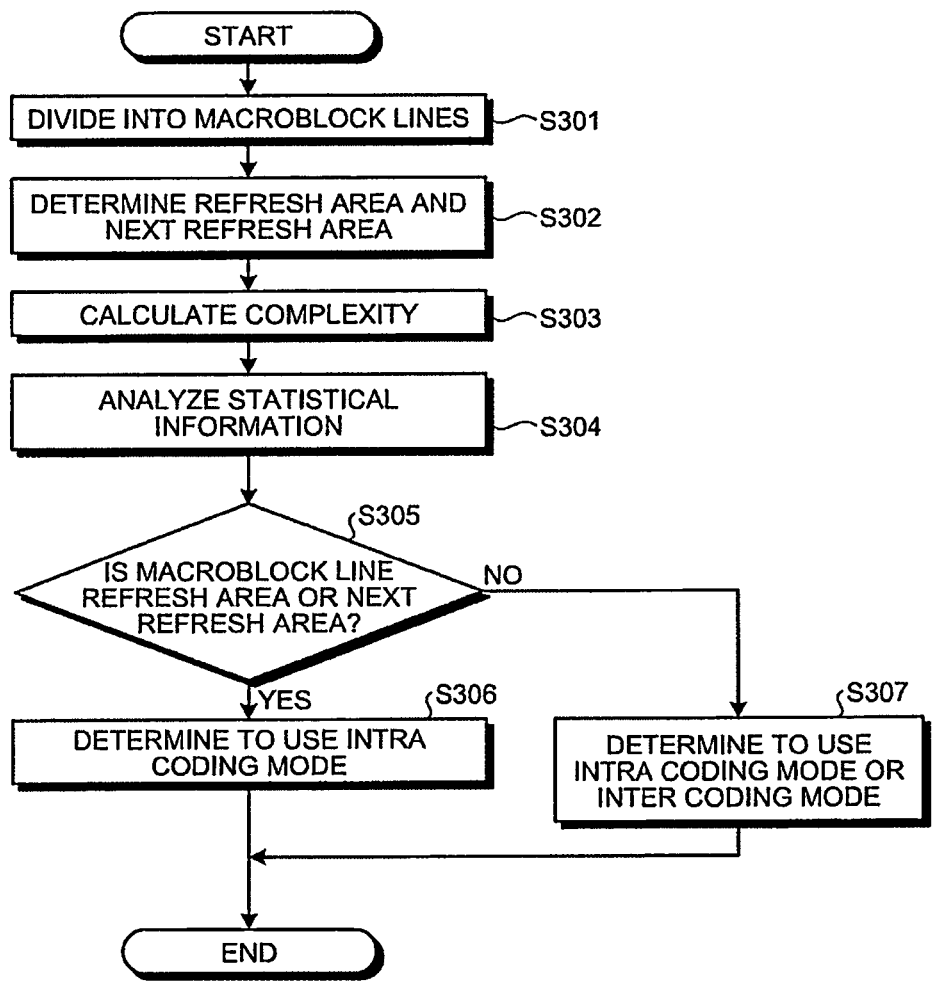
FIG. 4 is a flowchart illustrating the flow of a coding mode determining process performed by the coding mode determining circuit illustrated in FIG. 3.

Next, a coding mode determining process performed by the coding mode determining circuit 101 illustrated in FIG. 3 will be described. FIG. 4 is a flowchart illustrating the flow of a coding mode determining process performed by the coding mode determining circuit 101 illustrated in FIG. 3. The coding mode determining process is performed every time the coding apparatus 100 receives a moving image signal.

As illustrated in FIG. 4, when the coding apparatus 100 receives a moving image signal, the dividing unit 201 in the coding mode determining circuit 101 divides the moving image signal into a plurality of frames in time series, then divides each frame into macroblock lines, and outputs the frame signal after dividing the frames into macroblock lines to the refresh area determining unit 202 (Step S301).

The refresh area determining unit 202 that receives the frame signal partitions the frame signal into macroblock line units that corresponds to an assembly of macroblocks. Thereafter, the refresh area determining unit 202 not only determines that a macroblock line that becomes a refresh area using the step-by-step refresh method but also determines that a macroblock line that corresponds to a macroblock line that will become a refresh area in a subsequently processed frame becomes a next refresh area (Step S302). Then, the refresh area determining unit 202 outputs, to the complexity calculating unit 203, the statistical information analyzing unit 204, and the coding mode determining unit 205, the frame signal containing information indicating whether a macroblock line becomes a refresh area or becomes the next refresh area.

For macroblock lines other than the refresh area and the next refresh area, the complexity calculating unit 203, which receives the frame signal from the refresh area determining unit 202, calculates a feature value indicating complexity for each macroblock and outputs the calculated feature value to the coding mode determining unit 205 (Step S303).

For macroblock lines other than the refresh area and the next refresh area, the statistical information analyzing unit 204, which receives the frame signal from the refresh area determining unit 202, analyzes, for each macroblock, which one of the intra coding and the inter coding processes less coding information for coding on the basis of statistical information received from the statistical information obtaining circuit 116 and outputs the result of the analysis to the coding mode determining unit 205 (Step S304).

The coding mode determining unit 205 analyzes the frame signal received from the refresh area determining unit 202 and performs a process on each macroblock line. Specifically, if a macroblock line to be processed is a macroblock line that is determined to become a refresh area or a next refresh area by the refresh area, determining unit 202 (Yes at Step S305), the coding mode determining unit 205 determines that the target macroblock line is coded in an intra coding mode that processes a large amount of coding information (Step S306).

In contrast, if a macroblock line to be processed is not a macroblock line that is determined to become a refresh area or a next refresh area (No at Step S305), the coding mode determining unit 205 determines, for each macroblock, which one of the intra coding mode and the inter coding mode is used to code the target macroblock line (Step S307).

As described above, the coding apparatus 100 according to the first embodiment not only determines that a macroblock line becomes a refresh area using the step-by-step refresh method but also determines that a macroblock line that corresponds to a macroblock line that will become a refresh area in a subsequently processed frame becomes a next refresh area. Accordingly, the macroblock line, which is inter coded in a subsequently processed frame, does not refer to the macroblock line from which leakage occurs. As a result, it is possible to eliminate the problem of image degradation due to referring to the frame where leakage occurs propagating to the next and subsequent frames. Thus, the coding apparatus 100 according to the first embodiment can code, while shortening an initial delay time using the step-by-step refresh method, a moving image using the H.264 coding method without degradation of the moving image that is to be decoded.

[b] Second Embodiment

In the first embodiment, a case is described as an example in which a next refresh area is coded in the intra coding mode that processes a large amount of coding information. In a second embodiment, a case will be described as an example in which a next refresh area is divided into sub-blocks, and a sub-block adjacent to the refresh area is coded in the intra coding mode that processes a large amount of coding information.

Figure 5:
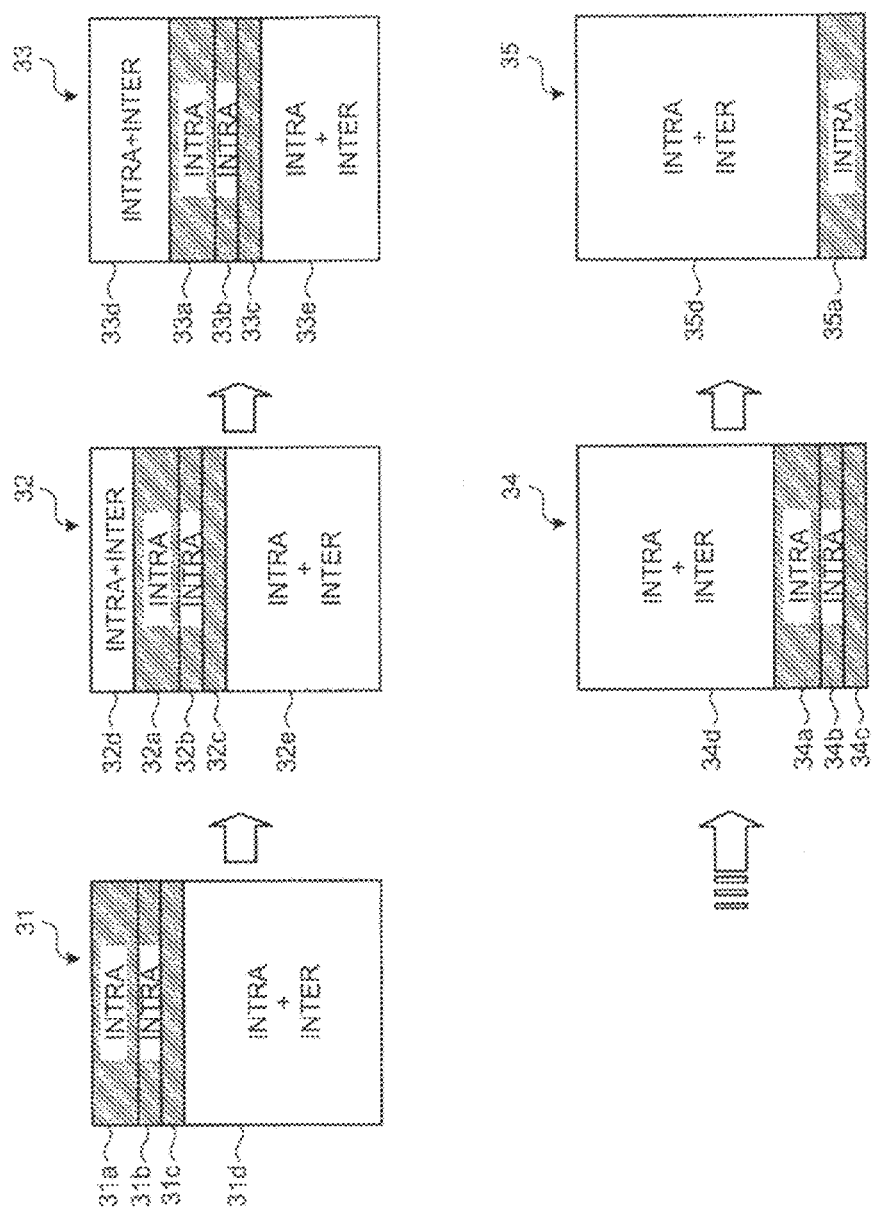
FIG. 5 is a schematic diagram illustrating the outline of a coding process performed by a coding apparatus according to a second embodiment.

FIG. 5 is a schematic diagram illustrating the outline of a coding process performed by a coding apparatus according to the second embodiment. As illustrated in FIG. 5, the coding apparatus according to the second embodiment divides a macroblock line of a next refresh area into sub-blocks. The dividing into sub-blocks is performed by a block dividing function that is used in the H.264 coding method, where a frame is divided into blocks of "8×8" pixels, "4×4" pixels, or the like.

The coding apparatus according to the second embodiment performs a process by partitioning a next refresh area that is divided into sub-blocks into sub-block lines; a sub-block line corresponds to an assembly of sub-blocks. In the example illustrated in FIG. 5, a next refresh area in a frame 31 is partitioned into a sub-block line 31b (intra) and a sub-block line 31c (intra with small amount of coding information), and a next refresh area in a frame 32 is partitioned into a sub-block line 32b (intra) and a sub-block line 32c (intra with small amount of coding information).

Then, the coding apparatus according to the second embodiment codes a sub-block line adjacent to a refresh area (hereinafter, a sub-block line adjacent to a refresh area is referred to as "adjacent sub-block line") in an intra coding mode that processes a large amount of coding information and codes a sub-block line that is not adjacent to the refresh area (hereinafter, a sub-block line that is not adjacent to a refresh area is referred to as "non-adjacent sub-block line") in an intra coding mode that processes a small amount of coding information.

In the example illustrated in FIG. 5, in the frame 31, the sub-block line 31b that is adjacent to the refresh area (a macroblock line 31a) is coded in the intra coding mode that processes a large amount of coding information, and the sub-block line 31c that is not adjacent to the refresh area is coded in the intra coding mode that processes a small amount of coding information. Accordingly, it is possible to prevent leakage from the sub-block line 31b with respect to the macroblock line 31a.

In this way, with the coding apparatus according to the second embodiment, the next refresh area is divided into sub-blocks, and only the sub-block line adjacent to the refresh area is coded in the intra coding mode that processes a large amount of coding information. Accordingly, the large amount of coding information is allocated to only the minimum necessary area for preventing leakage, which makes it possible to prevent the leakage even when a little small amount of coding information is allocated to a single frame.

Figure 6:
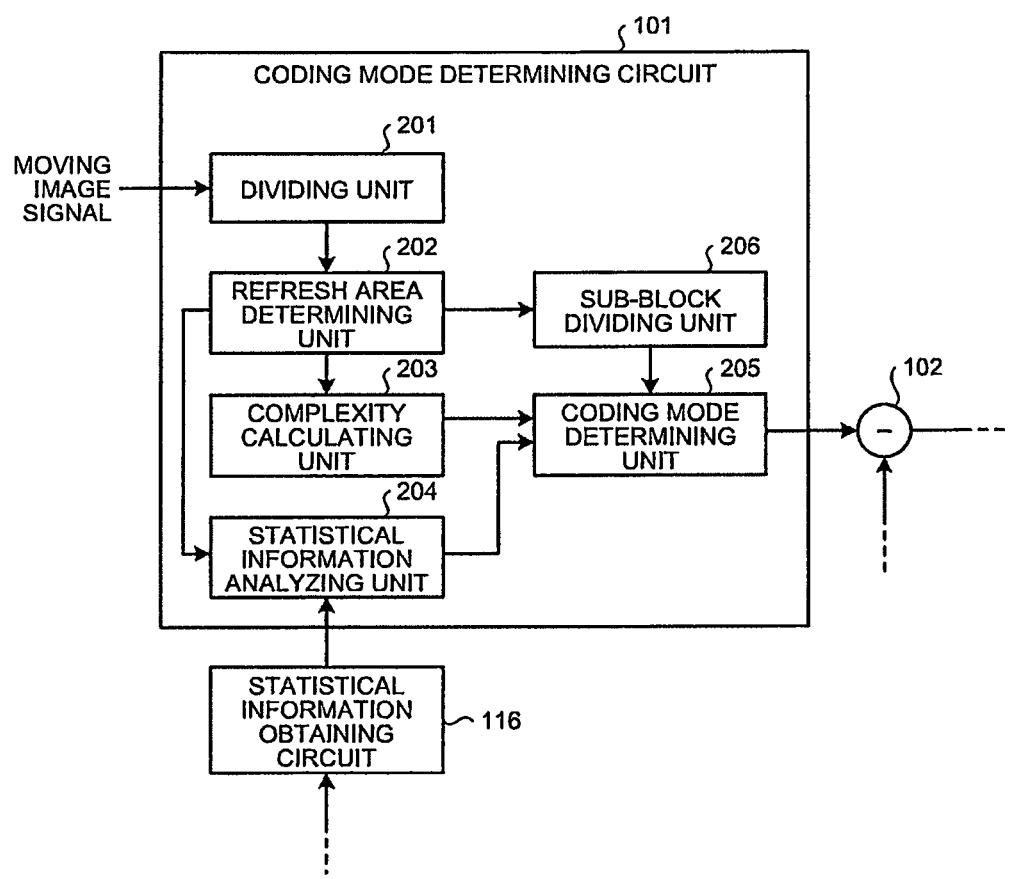
FIG. 6 is a functional block diagram illustrating the configuration of a coding mode determining circuit according to a the second embodiment.

Next, the configuration of the coding mode determining circuit 101 according to the second embodiment will be described. FIG. 6 is a functional block diagram illustrating the configuration of the coding mode determining circuit 101 according to the second embodiment. The configuration of the circuit of the coding apparatus 100 according to the second embodiment is the same as that illustrated in FIG. 2. As illustrated in FIG. 6, the coding mode determining circuit 101 according to the second embodiment further includes a sub-block dividing unit 206 when compared with the coding mode determining circuit 101 according to the first embodiment (see FIG. 3).

The sub-block dividing unit 206 is a processing unit that divides a macroblock line that is determined to be a next refresh area by the refresh area determining unit 202 into sub-blocks and outputs the frame signal divided into sub-blocks to the coding mode determining unit 205.

The coding mode determining unit 205 that receives the frame signal from the sub-block dividing unit 206 performs a process of partitioning the next refresh area, divided into sub-blocks, into sub-block lines; a sub-block line corresponds to an assembly of sub-blocks. Then, the coding mode determining unit 205 determines that a macroblock line that is determined to be a refresh area by the refresh area determining unit 202 and the adjacent sub-block line is coded in the intra coding mode that processes a large amount of coding information. The coding mode determining unit 205 determines that a non-adjacent sub-block line is coded in the intra coding mode that processes a small amount of coding information.

Furthermore, the coding mode determining unit 205 determines, for each macroblock, which one of the intra coding and the inter coding is used for the macroblock line other than the refresh area and the next refresh area.

Figure 7:
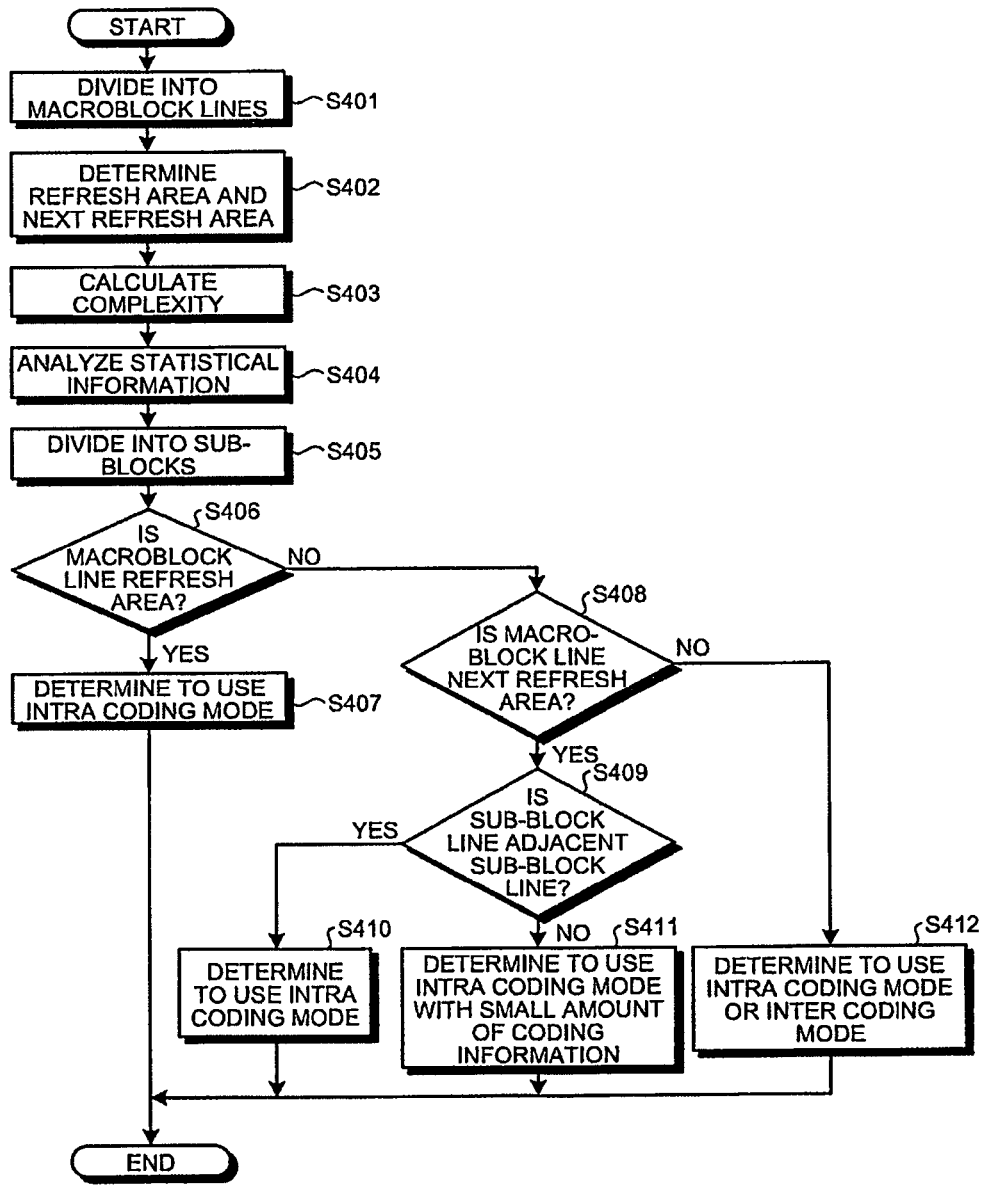
FIG. 7 is a flowchart illustrating the flow of a coding mode determining process performed by the coding mode determining circuit illustrated in FIG. 6.

Next, a coding mode determining process performed by the coding mode determining circuit 101 illustrated in FIG. 6 will be described. FIG. 7 is a flowchart illustrating the flow of the coding mode determining process performed by the coding mode determining circuit 101 illustrated in FIG. 6. The flow of the coding mode determining process performed at Steps S401 to S404 illustrated in FIG. 7 is identical to that illustrated in FIG. 4; therefore, a description thereof is not repeated.

As illustrated in FIG. 7, the sub-block dividing unit 206 divides a macroblock line that is determined to become a next refresh area by the refresh area determining unit 202 into sub-blocks and outputs a frame signal divided into sub-blocks to the coding mode determining unit 205 (Step S405).

Then, the coding mode determining unit 205 analyzes the frame signal received from the sub-block dividing unit 206 and processes in macroblock line units. Specifically, if a macroblock line to be processed is a macroblock line that is determined to become a refresh area by the refresh area determining unit 202 (Yes at Step S406), the coding mode determining unit 205 determines that the target macroblock line is coded in the intra coding mode that processes a large amount of coding information (Step S407).

In contrast, if the macroblock line to be processed is a macroblock line that is determined to become a next refresh area by the refresh area determining unit 202 (No at Step S406 and Yes at Step S408), the coding mode determining unit 205 performs a partitioning process on the target macroblock line, whereby partitioning it into sub-block lines that correspond to an assembly of sub-blocks.

Then, if the sub-block line to be processed is an adjacent sub-block line (Yes at Step S409), the coding mode determining unit 205 determines that the target sub-block line is coded in the intra coding mode that processes a large amount of coding information (Step S410). In contrast, if the sub-block line is a non-adjacent sub-block line (No at Step S409), the coding mode determining unit 205 determines that the target sub-block line is coded in the intra coding mode that processes a small amount of coding information (Step S411).

Furthermore, if the macroblock line to be processed is not the refresh area (No at Step S406) nor the next refresh area (No at Step S408), the coding mode determining unit 205 determines, for each macroblock, which one of the intra coding and the inter coding is used for the target macroblock line (Step S412).

As described above, the coding apparatus 100 according to the second embodiment divides the next refresh area into sub-blocks and codes only the adjacent sub-block line adjacent to the refresh area in the intra coding mode that processes a large amount of coding information. Accordingly, a large amount of coding information is allocated only to the minimum necessary area needed to prevent leakage, which makes it possible to prevent the leakage even when a little small amount of coding information is allocated to a single frame.

The coding apparatus 100 according to the second embodiment can be configured such that the adjacent sub-block line is coded in the inter coding mode that processes a large amount of coding information, and the non-adjacent sub-block line is coded in the inter coding mode that processes a small amount of coding information. By performing inter coding that processes a large amount of coding information on the adjacent sub-block line, it is possible to obtain the same effect as in a case in which the intra coding that processes a large amount of coding information is performed. Accordingly, it is possible to prevent leakage as much as possible even when the amount of coding information exceeds the amount of coding information that can be allocated to a single frame if the adjacent sub-block line is intra coded that processes a large amount of coding information.

Figure 8:
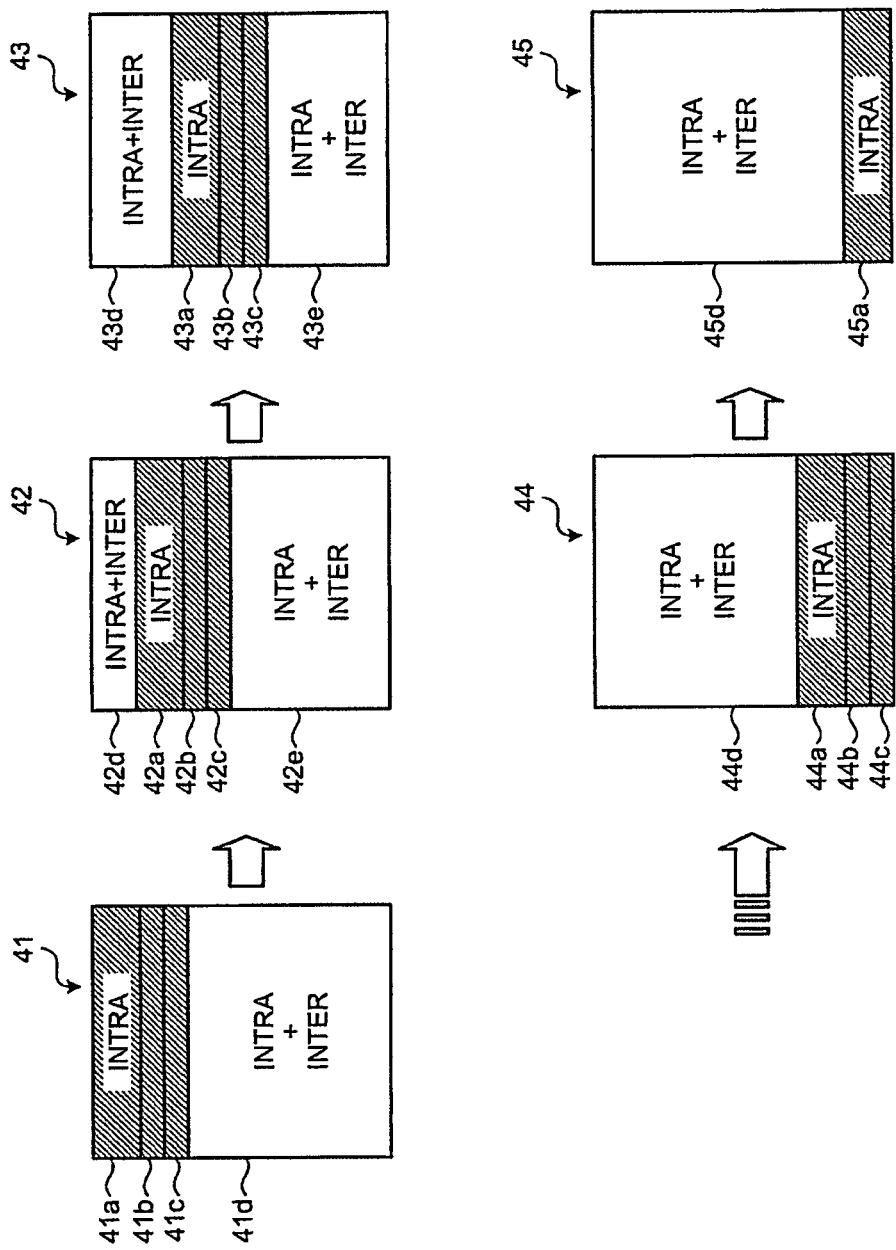
FIG. 8 is a schematic diagram illustrating the outline of a coding process, performed by the coding apparatus, in a case in which a sub-block line is subjected to inter coding.

FIG. 8 is a schematic diagram illustrating the outline of a coding process, performed by the coding apparatus 100, in a case in which a sub-block line is inter coded. As illustrated in FIG. 8, the coding apparatus codes the adjacent sub-block line in the inter coding mode that processes a large amount of coding information and codes the non-adjacent sub-block line in the inter coding mode that processes a small amount of coding information. For example, in a frame 41, a sub-block line 41*b* (inter with large amount of coding information) is coded in the inter coding mode that processes a large amount of coding information, and a sub-block line 41*c* (inter with small amount of coding information) is coded in the inter coding mode that processes a small amount of coding information.

Figure 9:
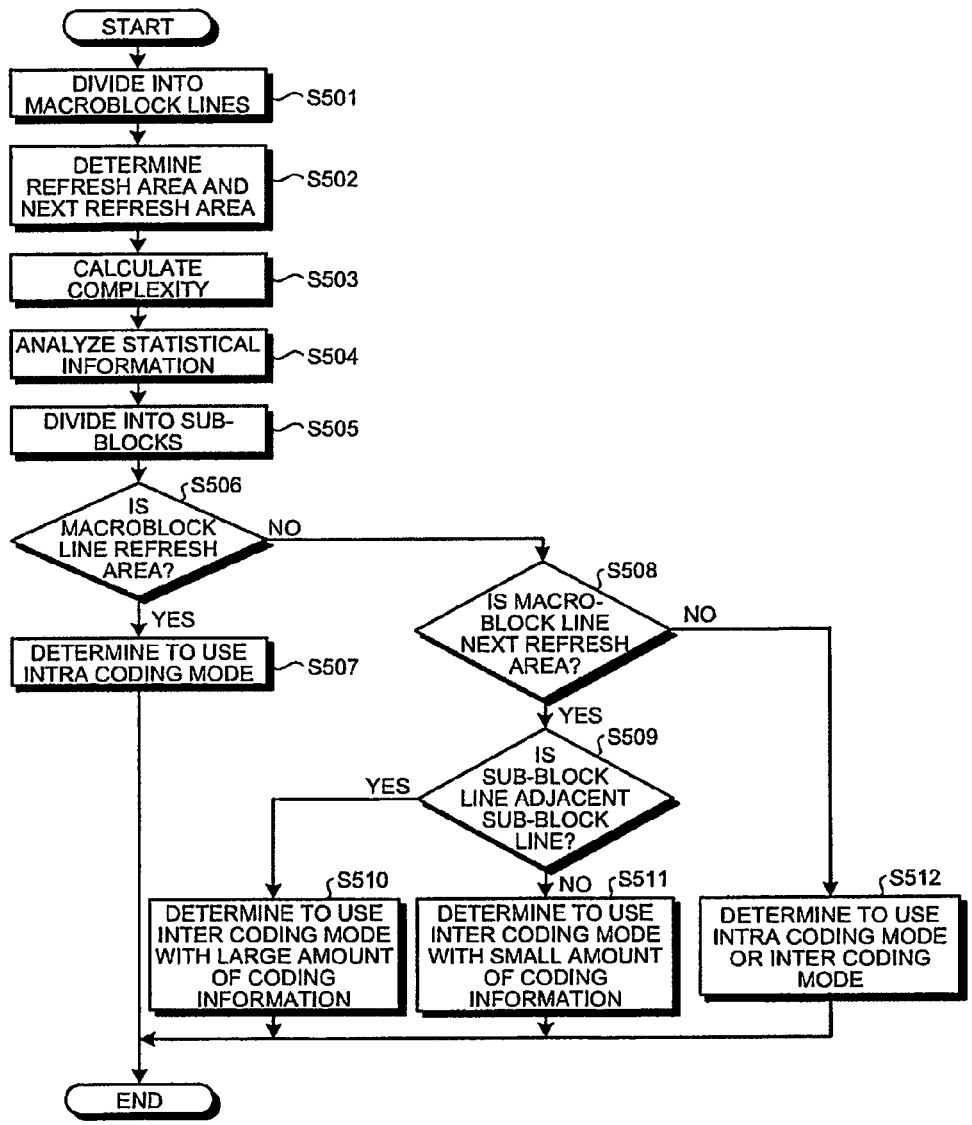
FIG. 9 is a flowchart illustrating the flow of a coding mode determining process, performed by a coding mode determining circuit, in a case in which the sub-block line is subjected to inter coding.

FIG. 9 is a flowchart illustrating the flow of the coding mode determining process, performed by the coding mode determining circuit 101, in a case in which the sub-block line is inter coded. The flow of the coding mode determining process performed at Steps S501 to S508 and S512 illustrated in FIG. 9 is identical to that illustrated in FIG. 7; therefore, a description thereof is not repeated.

As illustrated in FIG. 9, if a sub-block line to be processed is an adjacent sub-block line (Yes at Step S509), the coding mode determining unit 205 determines that the target sub-block line is coded in the inter coding mode that processes a large amount of coding information (Step S510). In contrast, if the sub-block line to be processed is a non-adjacent sub-block line (No at Step S509), the coding mode determining unit 205 determines that the target sub-block line is coded in the inter coding mode that processes a small amount of coding information (Step S511).

Furthermore, the coding apparatus 100 according to the second embodiment can be configured such that the adjacent sub-block line is coded in the inter coding mode that processes a large amount of coding information, and the non-adjacent sub-block line is allocated to a skip block. The skip block is a block to which only a piece of information is added indicating that coding information on a frame that is processed one process before is used without any change. When the skip block is decoded, a decoder uses a frame image that is processed one process before without any change.

The amount of coding information contained in a single frame can be made small by allocating the non-adjacent sub-block line to the skip block. Accordingly, even when the amount of coding information that can be allocated to a single frame is extremely small, leakage can be prevented as much as possible. Furthermore, because the non-adjacent sub-block line allocated to the skip block becomes a refresh area in a subsequently processed frame, a moving image that has been decoded is hardly degraded.

Figure 10:
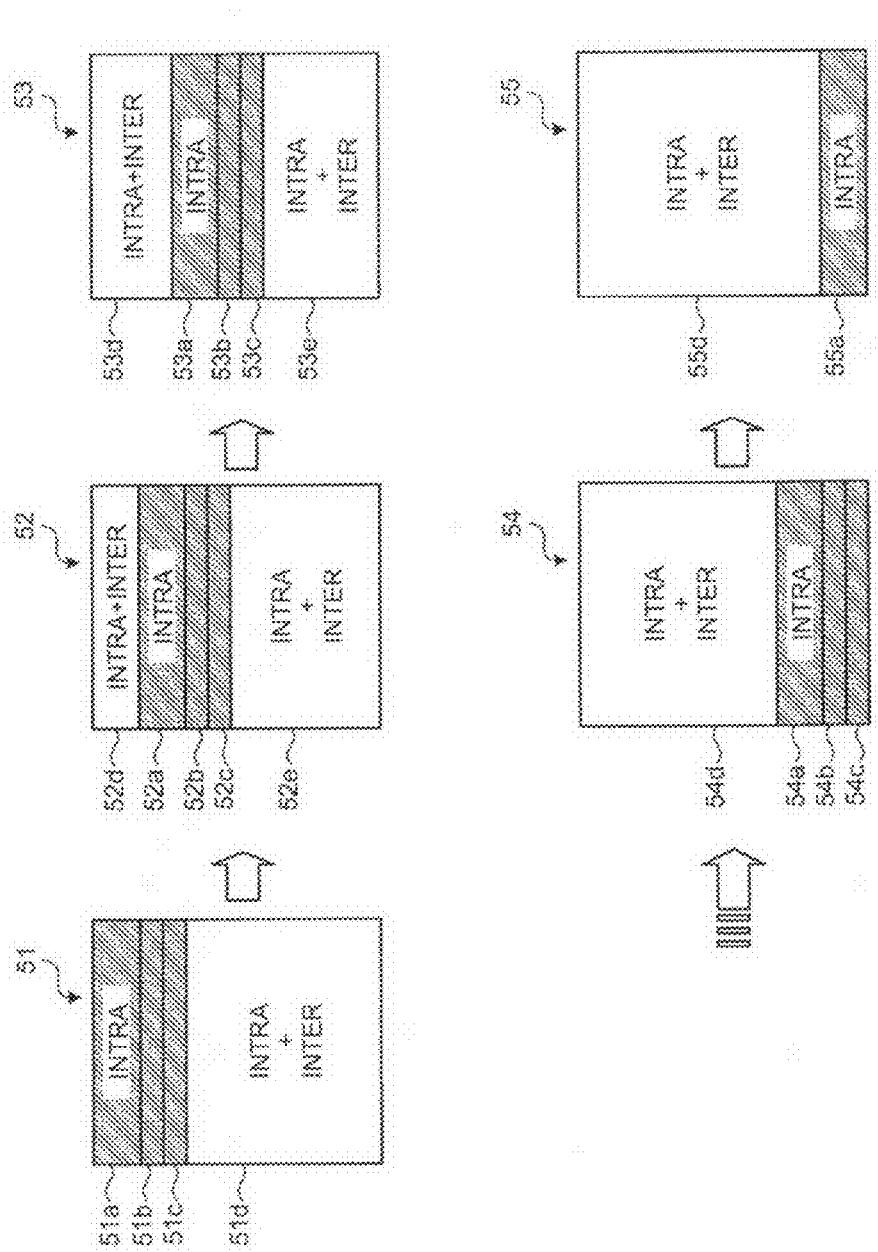
FIG. 10 is a schematic diagram illustrating the outline of a coding process, performed by the coding apparatus, in a case in which a non-adjacent sub-block line is allocated to a skip block.

FIG. 10 is a schematic diagram illustrating the outline of a coding process, performed by the coding apparatus 100, in a case in which a non-adjacent sub-block line is allocated to a skip block. As illustrated in FIG. 10, the coding apparatus codes an adjacent sub-block line in the inter coding mode that processes a large amount of coding information and allocates a non-adjacent sub-block line to a skip block. For example, for a frame 51, a sub-block line 51*b* (inter with large amount of coding information) is processed by the inter coding that processes a large amount of coding information and a sub-block line 51*c* (coding information on previous image) is allocated to a skip block.

Figure 11:
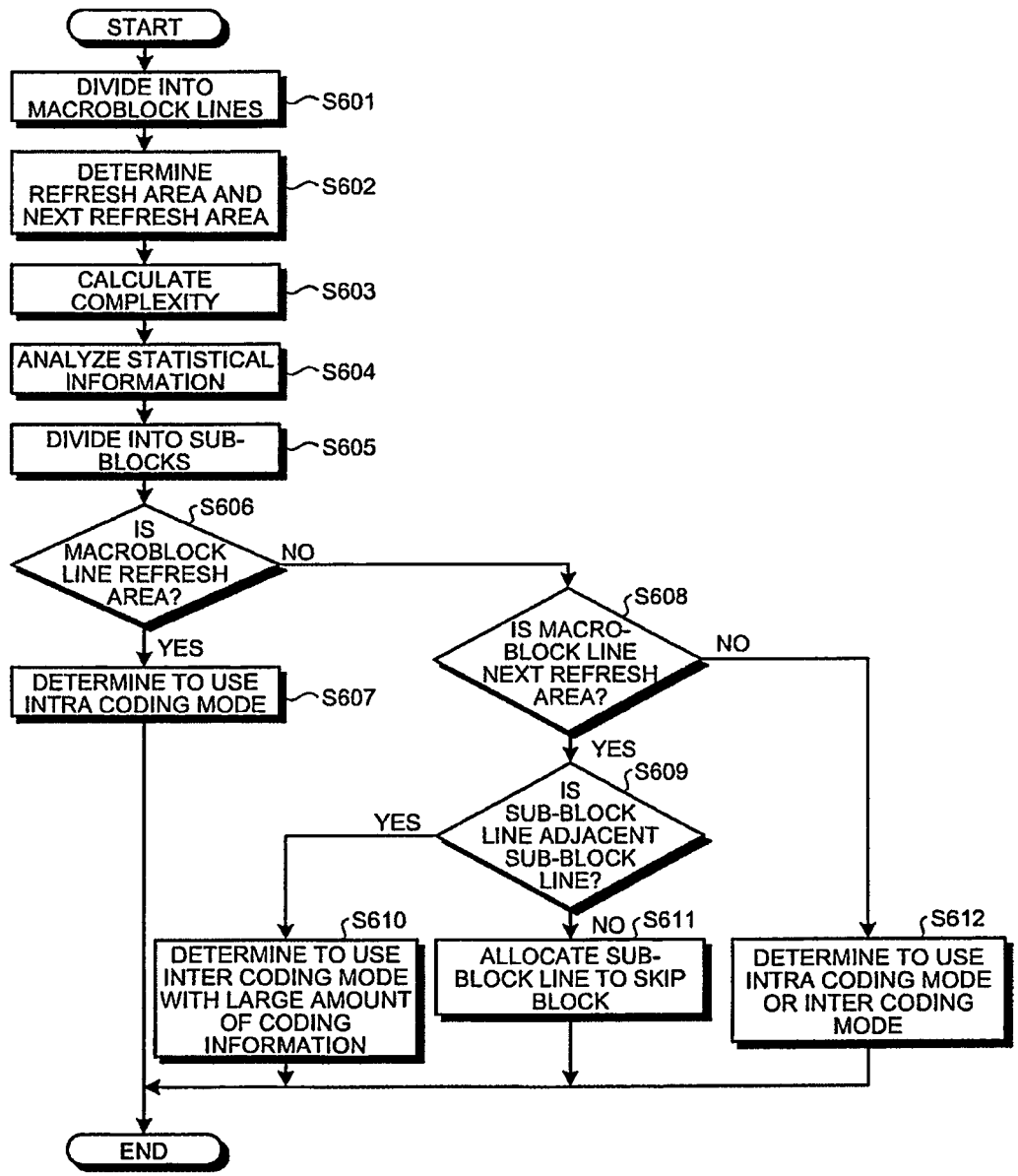
FIG. 11 is a flowchart illustrating the flow of a coding mode determining process, performed by the coding mode determining circuit, in a case in which a non-adjacent sub-block line is allocated to a skip block.

FIG. 11 is a flowchart illustrating the flow of a coding mode determining process, performed by the coding mode determining circuit 101, in a case in which the non-adjacent sub-block line is allocated to the skip block. The flow of the coding mode determining process performed at Steps S601 to S608 and S612 illustrated in FIG. 11 is identical to that illustrated in FIG. 9; therefore, a description thereof is not repeated.

As illustrated in FIG. 11, if a sub-block line in a macroblock line to be processed is an adjacent sub-block line (Yes at Step S609), the coding mode determining unit 205 determines that the target sub-block line is coded in the inter coding mode that processes a large amount of coding information (Step S610). In contrast, if a sub-block line in the macroblock line to be processed is a non-adjacent sub-block line (No at Step S609), the coding mode determining unit 205 allocates the target sub-block line to a skip block (Step S611).

[c] Third Embodiment

In the first and second embodiments, a case is described as an example in which the next refresh area or the adjacent sub-block line is intra coded or inter coded. In a third embodiment, a case is described as an example in which a plurality of the coding methods described in the first and second embodiments is stored in a predetermined storing unit and coding is performed in accordance with a coding method stored in the storing unit.

Figures 12, 13:
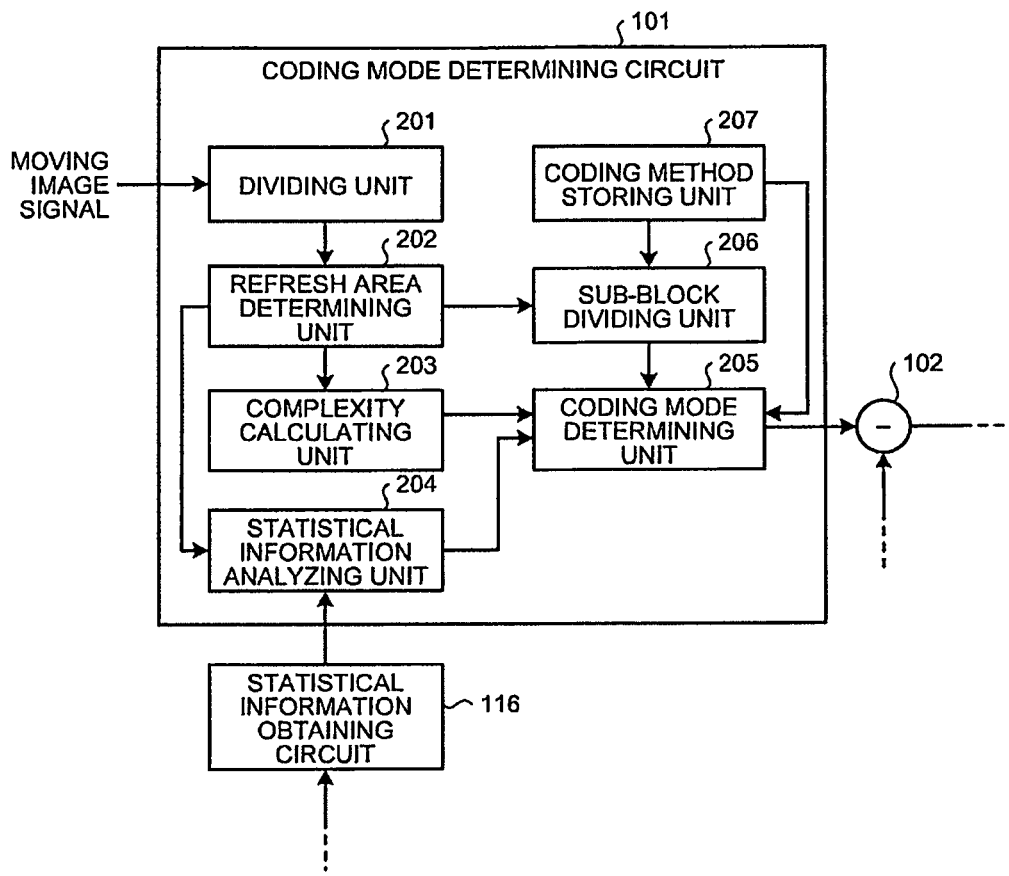
FIG. 12 is a functional block diagram illustrating the configuration of a coding mode determining circuit according to a third embodiment.
FIG. 13 is a schematic diagram illustrating an example of a coding method storing unit.

FIG. 12 is a functional block diagram illustrating the configuration of the coding mode determining circuit 101 according to a third embodiment. The configuration of the circuit of the coding apparatus 100 according to the third embodiment is the same as that illustrated in FIG. 2. As illustrated in FIG. 12, the coding mode determining circuit 101 according to the third embodiment further includes a coding method storing unit 207 when compared with the coding mode determining circuit 101 according to the second embodiment (see FIG. 6).

The coding method storing unit 207 stores therein a plurality of coding methods described in the first and second embodiments. FIG. 13 is a schematic diagram illustrating an example of the coding method storing unit 207. As illustrated in FIG. 13, the coding method storing unit 207 stores therein a setting content and a coding method selection.

The plurality of coding methods described in the first and second embodiments are stored in the setting content. In the example illustrated in FIG. 13, it is defined that a "normal method" stored in the setting content indicates a case in which a coding process is performed using the conventional step-by-step refresh method, not using the coding method described in the first and second embodiments; a "first coding method" indicates the coding method illustrated in FIG. 1; a "second coding method" indicates the coding method illustrated in FIG. 5; a "third coding method" indicates the coding method illustrated in FIG. 8; and a "fourth coding method" indicates the coding method illustrated in FIG. 10.

The coding method selection stores therein information about which coding method is used for the coding process. In the example illustrated in FIG. 13, the coding apparatus 100 performs the coding process using the "first coding method" in which "1" is set as the coding method selection. Simply by updating that coding method selection, it is possible to easily change a coding method used for a coding process performed by the coding apparatus 100.

If one of the "second coding method", the "third coding method", and the "fourth coding method" is selected in the coding method storing unit 207, the sub-block dividing unit 206 divides the next refresh area into sub-blocks. Then, the coding mode determining unit 205 performs the coding mode determining process in accordance with the coding method selected by the coding method storing unit 207.

Furthermore, the coding apparatus 100 can also be configured such that settings that are set in the coding method selection are automatically updated on the basis of the amount of coding information allocated to a single frame or complexity of the received moving image signal. Accordingly, the coding process can be performed using an optimum coding method in accordance with the circumstances, thus preventing leakage as much as possible even when a small amount of coding information is allocated to a single frame.

In FIG. 12, a case in which the coding mode determining circuit 101 includes the coding method storing unit 207 is described as an example; however, the coding method storing unit 207 can be stored in a nonvolatile memory, a hard disk drive, or the like in the coding apparatus 100.

As described above, with the coding apparatus 100 according to the third embodiment, a plurality of coding methods is stored in the coding method storing unit 207, and the coding process is performed in accordance with the coding method selected by the coding method storing unit 207. As a result, simply by updating the coding method storing unit 207, it is possible to easily change the coding methods.

In the first, second, and third embodiments, the coding apparatus 100 is described; however, various modifications are possible for the configuration of the coding apparatus 100 illustrated in FIG. 2 as long as they do not depart from the spirit of the present invention. For example, a function identical to that of the coding apparatus 100 can be implemented by installing a function included in the coding apparatus 100 as software and executing by a computer. In the following, an example of a computer that executes a coding program 1071 in which the function included in the coding apparatus 100 is installed as software is described.

Figure 14:
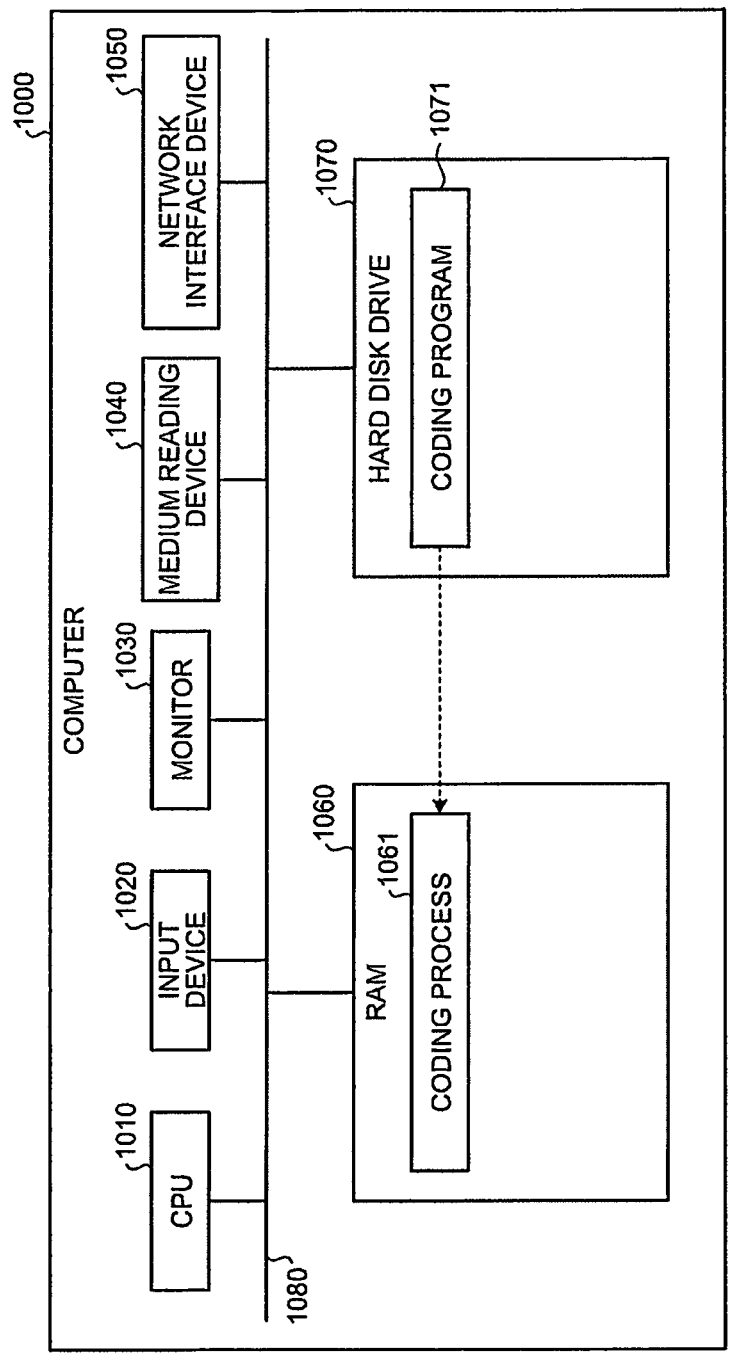
FIG. 14 is a functional block diagram illustrating a computer that executes a coding program.
Figure 18:
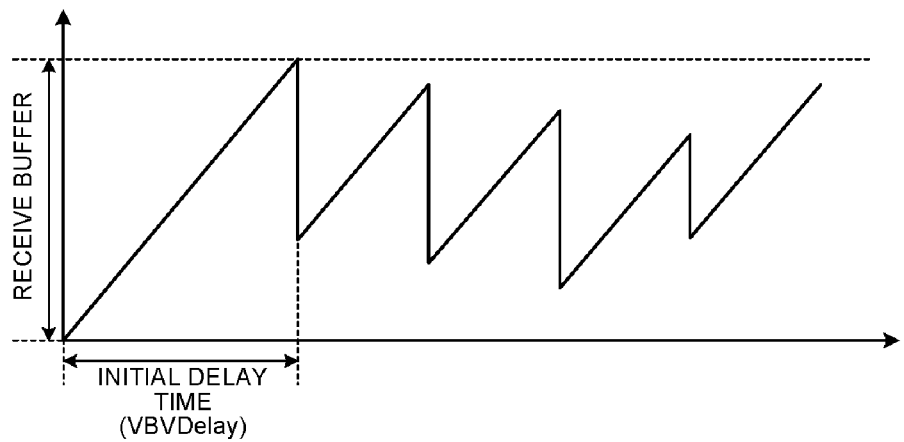
FIG. 18 is a schematic diagram illustrating a normal buffer model.
Figure 19:
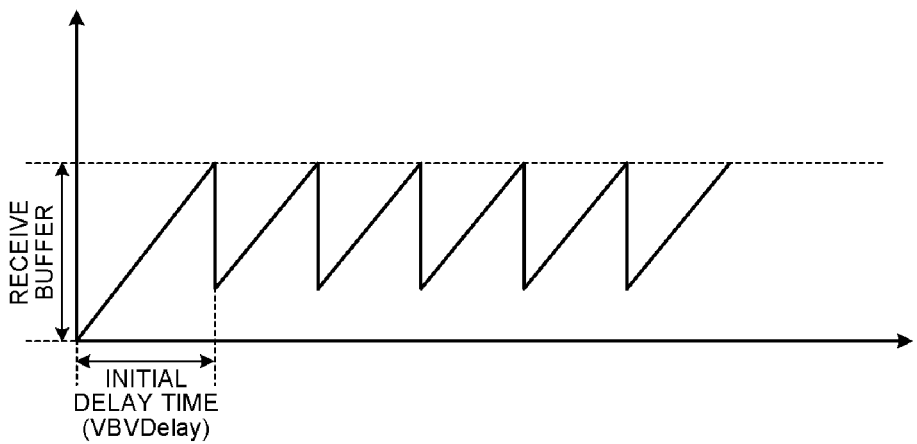
FIG. 19 is a schematic diagram illustrating a buffer model using the step-by-step refresh method.
Figure 20:
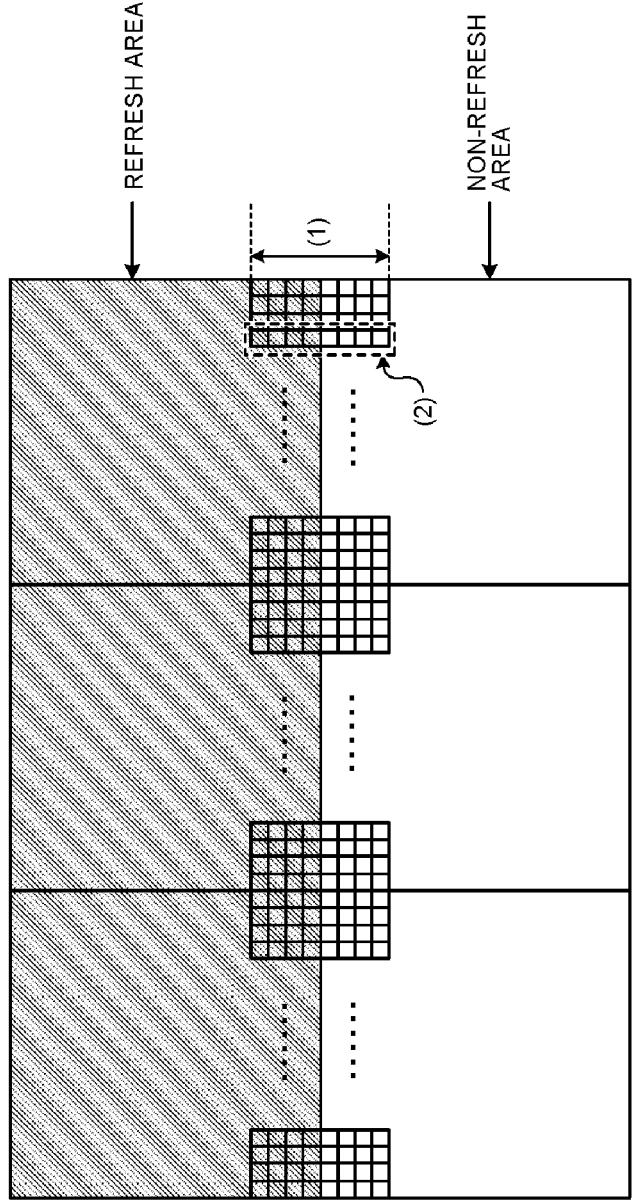
FIG. 20 is a schematic diagram illustrating a macroblock boundary subjected to a deblocking filter process.
Figure 21:
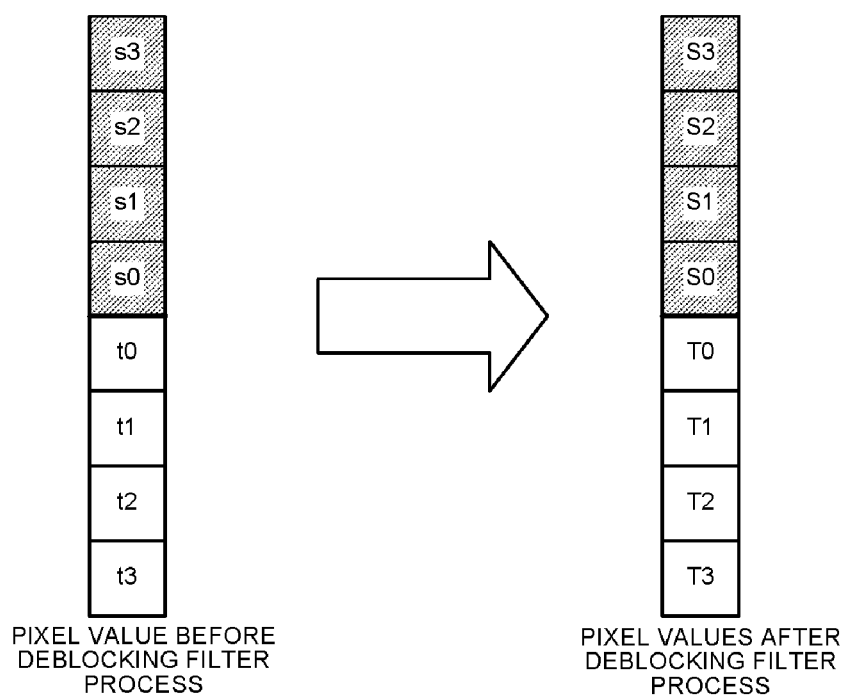
FIG. 21 is a schematic diagram illustrating pixel values before the deblocking filter process and pixel values after the deblocking filter process performed on a column (2) in FIG. 20.

FIG. 14 is a functional block diagram illustrating a computer 1000 that executes the coding program 1071. The computer 1000 includes a CPU 1010 that executes various kinds of computing processing, an input device 1020 that receives data from a user, a monitor 1030 that displays various kinds of information, a medium reading device 1040 that reads programs or the like from a recording medium, a network interface device 1050 that receives/transmits data between other computers via a network, a random access memory (RAM) 1060 that temporarily stores therein various kinds of information, and a hard disk drive 1070, which are connected via a bus 1080.

In the hard disk drive 1070, the coding program 1071 that has a function identical to that included in the coding apparatus 100 illustrated in FIG. 2 is stored. The CPU 1010 reads the coding program 1071 from the hard disk drive 1070 and expands it in the RAM 1060, whereby the coding program 1071 functions as a coding process 1061.

The coding program 1071 is not necessarily stored in the hard disk drive 1070. For example, the computer 1000 can read the coding program 1071 stored in a storage medium such as a CD-ROM and executes it. Alternatively, the coding program 1071 can be stored in another computer (or a server) that is connected to the computer 1000 via a public circuit, the Internet, a local area network (LAN), a wide area network (WAN), or the like and then the computer 1000 reads and executes the program from the above.

According to an aspect of the present invention, an advantage is provided in that a moving image can be coded using an H.264 coding method without degradation of the moving image to be decoded while shortening the initial delay time using a step-by-step refresh method.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A coding apparatus for performing a deblocking filter process by dividing input moving image data into frames, and coding the moving image data by dividing the frames into macroblock lines and by shifting and changing, for each frame, a refresh area in which an amount of coding information allocated to a specific macroblock line is larger than that of another macroblock line, the coding apparatus comprising:
   a refresh area determining unit that determines that a refresh area in a current frame being subjected to a coding process as well as a macroblock line in the current frame corresponding to a macroblock line that will become a refresh area in a frame being subsequently subjected to the coding process becomes a next refresh area that indicates a second refresh area in the current frame; and a coding unit that divides the next refresh area into sub-block lines that correspond to an assembly of sub-blocks, that performs coding on an adjacent sub-block line corresponding to a sub-block line adjacent to the refresh area by allocating a larger amount of coding information than an amount allocated to the other macroblock line, and that performs coding on a non-adjacent sub-block line corresponding to a sub-block line that is not adjacent to the refresh area by allocating a smaller amount of coding information than an amount allocated to the adjacent sub-block line.

2. The coding apparatus according to claim 1, wherein the coding unit performs intra coding on the next refresh area.

3. The coding apparatus according to claim 1, wherein the coding unit performs intra coding on the adjacent sub-block line and the non-adjacent sub-block line.

4. The coding apparatus according to claim 1, wherein the coding unit performs inter coding on the adjacent sub-block line and the non-adjacent sub-block line.

5. The coding apparatus according to claim 1, wherein the coding unit performs inter coding on the adjacent sub-block line and sets information that indicates to use, in the non-adjacent sub-block line, coding information about a frame that is previously subjected to the coding process processed one process before.

6. The coding apparatus according to claim 1, further comprising a coding method storing unit that stores therein a coding method indicating how to code the next refresh area, wherein the coding unit codes the next refresh area in accordance with a coding method stored in the coding method storing unit.

7. A coding method for performing a deblocking filter process by dividing input moving image data into frames, and coding the moving image data by dividing the frames into macroblock lines and by shifting and changing, for each frame, a refresh area in which an amount of coding information allocated to a specific macroblock line is larger than that of another macroblock line, the coding method comprising:

determining that a refresh area in a current frame being subjected to a coding process as well as a macroblock line in the current frame corresponding to a macroblock line that will become a refresh area in a frame being subsequently subjected to the coding process becomes a next refresh area that indicates a second refresh area in the current frame;

dividing the next refresh area into sub-block lines that correspond to an assembly of sub-blocks;

performing coding on an adjacent sub-block line corresponding to a sub-block line adjacent to the refresh area by allocating a larger amount of coding information than an amount allocated to the other macroblock line; and performing coding on a non-adjacent sub-block line corresponding to a sub-block line that is not adjacent to the refresh area by allocating a smaller amount of coding information than an amount allocated to the adjacent sub-block line.

8. A non-transitory computer readable storage medium having stored therein a coding program for performing a deblocking filter process by dividing input moving image data into frames, and coding the moving image data by dividing the frames into macroblock lines and by shifting and changing, for each frame, a refresh area in which an amount of coding information allocated to a specific macroblock line is larger than that of another macroblock line, the coding program causing a computer to execute a process comprising:

determining that a refresh area in a current frame being subjected to a coding process as well as a macroblock line in the current frame corresponding to a macroblock line that will become a refresh area in a frame being subsequently subjected to the coding process becomes a next refresh area that indicates a second refresh area in the current frame;

dividing the next refresh area into sub-block lines that correspond to an assembly of sub-blocks;

performing coding on an adjacent sub-block line corresponding to a sub-block line adjacent to the refresh area by allocating a larger amount of coding information than an amount allocated to the other macroblock line; and performing coding on a non-adjacent sub-block line corresponding to a sub-block line that is not adjacent to the refresh area by allocating a smaller amount of coding information than an amount allocated to the adjacent sub-block line.

9. A coding circuit for performing a deblocking filter process by dividing input moving image data into frames, and coding the moving image data by dividing the frames into macroblock lines and by shifting and changing, for each frame, a refresh area in which an amount of coding information allocated to a specific macroblock line is larger than that of another macroblock line, the coding circuit comprising:

a refresh area determining unit that determines that a refresh area in a current frame being subjected to a coding process as well as a macroblock line in the current frame corresponding to a macroblock line that will become a refresh area in a frame being subsequently subjected to the coding process becomes a next refresh area that indicates a second refresh area in the current frame; and a coding unit that divides the next refresh area into sub-block lines that correspond to an assembly of sub-blocks, that performs coding on an adjacent sub-block line corresponding to a sub-block line adjacent to the refresh area by allocating a larger amount of coding information than an amount allocated to the other macroblock line, and that performs coding on a non-adjacent sub-block line corresponding to a sub-block line that is not adjacent to the refresh area by allocating a smaller amount of coding information than an amount allocated to the adjacent sub-block line.

* * * * *